(12) United States Patent  
Chin

(10) Patent No.: US 6,549,402 B2
(45) Date of Patent: Apr. 15, 2003

(54) INDUSTRIAL COMPUTER INDEPENDENT UNIT DEVICE

(76) Inventor: Ke-Wei Chin, 5F, 406, Kungkuan Road, Taipei (TW)

( * ) Notice: Subject to any disclaimer, the term of this patent is extended or adjusted under 35 U.S.C. 154(b) by 0 days.

(21) Appl. No.: 09/929,012

(22) Filed: Aug. 15, 2001

(65) Prior Publication Data

US 2002/0089823 A1 Jul. 11, 2002

(30) Foreign Application Priority Data

Jan. 6, 2001 (TW) ........................................ 090209043

(51) Int. Cl.$^7$ ................................................. G06F 1/16

(52) U.S. Cl. ...................... 361/687; 361/707; 360/98.1; 364/708.1

(58) Field of Search ................................. 361/687, 683, 361/704, 707, 724–727; 360/97.01, 98.01; 364/708.1

(56) References Cited

U.S. PATENT DOCUMENTS

| | | | | |
|---|---|---|---|---|
| 6,392,884 B1 | * | 5/2002 | Chou | 361/687 |
| 6,424,526 B1 | * | 7/2002 | Heard | 361/687 |
| 2002/0089823 A1 | * | 7/2002 | Chin | 361/687 |

* cited by examiner

Primary Examiner—Darren Schuberg
Assistant Examiner—Hung Van Duong
(74) Attorney, Agent, or Firm—Troxell Law Office PLLC

(57) ABSTRACT

An industrial computer independent unit is disclosed for improving a standardized industrial computer. Especially, An industrial computer independent unit device capable of receiving a compact disk drive set, more than four hard disk drive sets, and a plurality of heat dissipating fans and the hard disk drive sets and the heat dissipating fans are updated or maintained without needing to stop an operation of a computer mainframe or to open a casing. In the present invention, if any of the disk drive set and heat dissipating fan has any fault, it will emit an alarm voice and the indicating lights will light up to inform the user and indicate a fault unit.

7 Claims, 6 Drawing Sheets

_US 6,549,402 B2_

INDUSTRIAL COMPUTER INDEPENDENT UNIT DEVICE

BACKGROUND OF THE INVENTION

1. Field of the invention

The present invention relates to an industrial computer, and particularly to an industrial computer independent unit device.

2. Description of the Related Art

The industrial computer is mainly utilized to process a large amount of data, and a plurality of affairs at the same time and perform complex logic operations. Since the advance of electronic technologies, the operations of an industrial computer are more and more complex with higher speeds. Therefore, the heat dissipation of an industrial computer is increased greatly. This problem must be resolved, otherwise the computer can not operate normally and possibly, some components will be destroyed.

Devices, such as computers or servos have functions of networking to Internet, or system operation, or monitoring, and others. Therefore, the operation must be uninterrupted and thus, the fault hard disk drive or heat dissipating device must be updated in operation or maintained.

In general effective temperature control of a computer mainframe, cool air is drawn into a device by a heat dissipating fan or the heat in the device is exhausted out. But a standardized industrial computer, the heat dissipating fan can not be updated directly due to the structure thereof. Furthermore, in a disk array arranged, the disk drive to be updated can not be processed easily.

SUMMARY OF THE INVENTION

An industrial computer independent unit is disclosed for improving a standardized industrial computer. Especially, an industrial computer independent unit device capable of receiving a compact disk drive set, more than four hard disk drive sets, and a plurality of heat dissipating fans is disclosed. The hard disk drive sets and the heat dissipating fans are updated or maintained without needing to stop an operation of a computer mainframe or to open a casing. In the present invention, if any of the disk drive set and heat dissipating fan has any fault, it will emit an alarm voice and the indicating lights 6 will light up to inform the user and indicate what unit has a fault.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
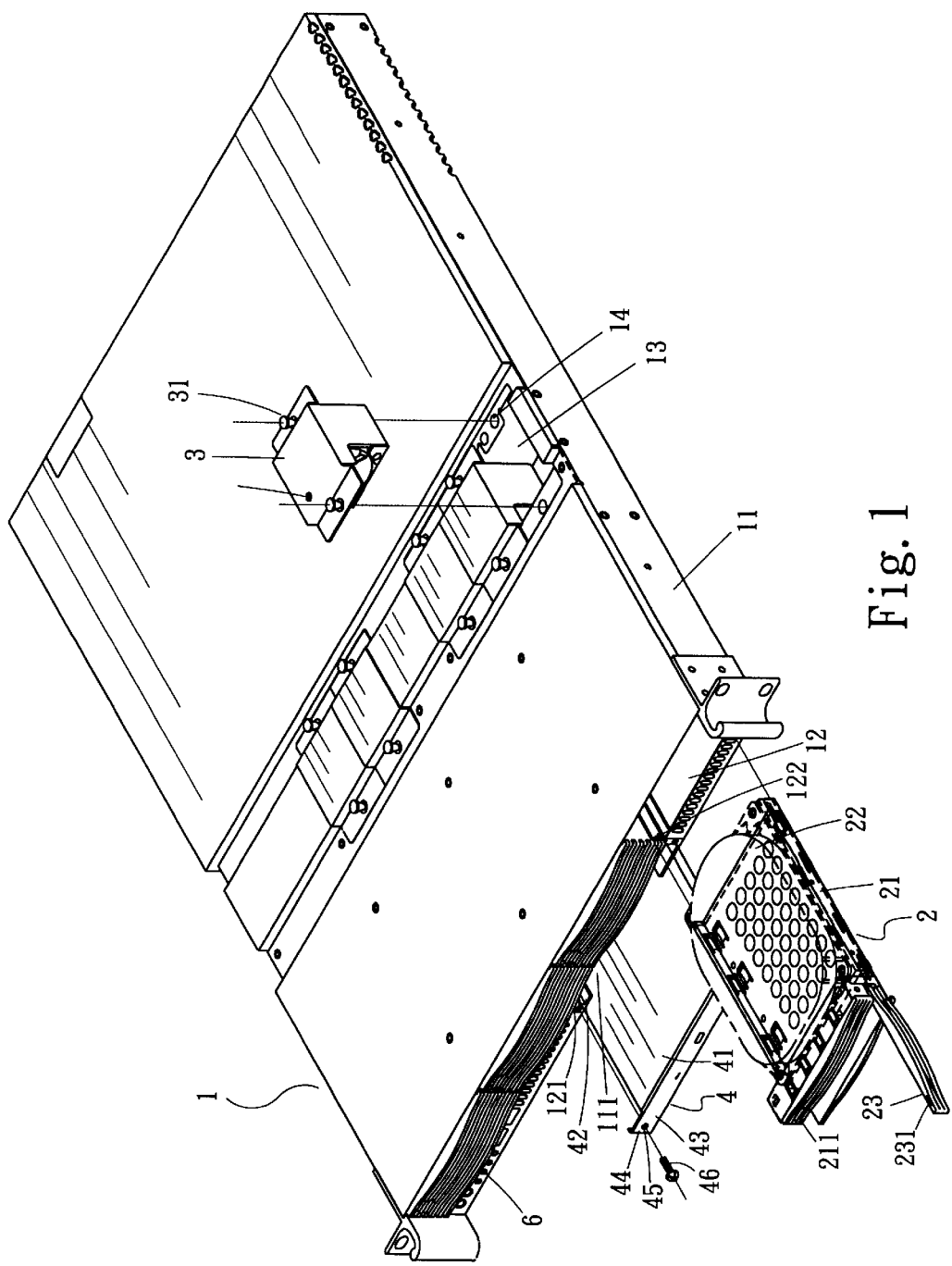
FIG. 1 is an exploded perspective view of one embodiment of the present invention.

Referring to FIG. 1, the industrial computer independent unit device of the present invention is illustrated. An industrial computer independent unit 1 has a frame 11. The front edge of the frame 11 has a disk groove 12 which can be installed with four disk drive sets 2 and a compact disk drive groove 42 for receiving a compact disk drive set 4. A fan groove 13 is installed near the central portion for being installed with several heat dissipating fans 3.

Figure 2:
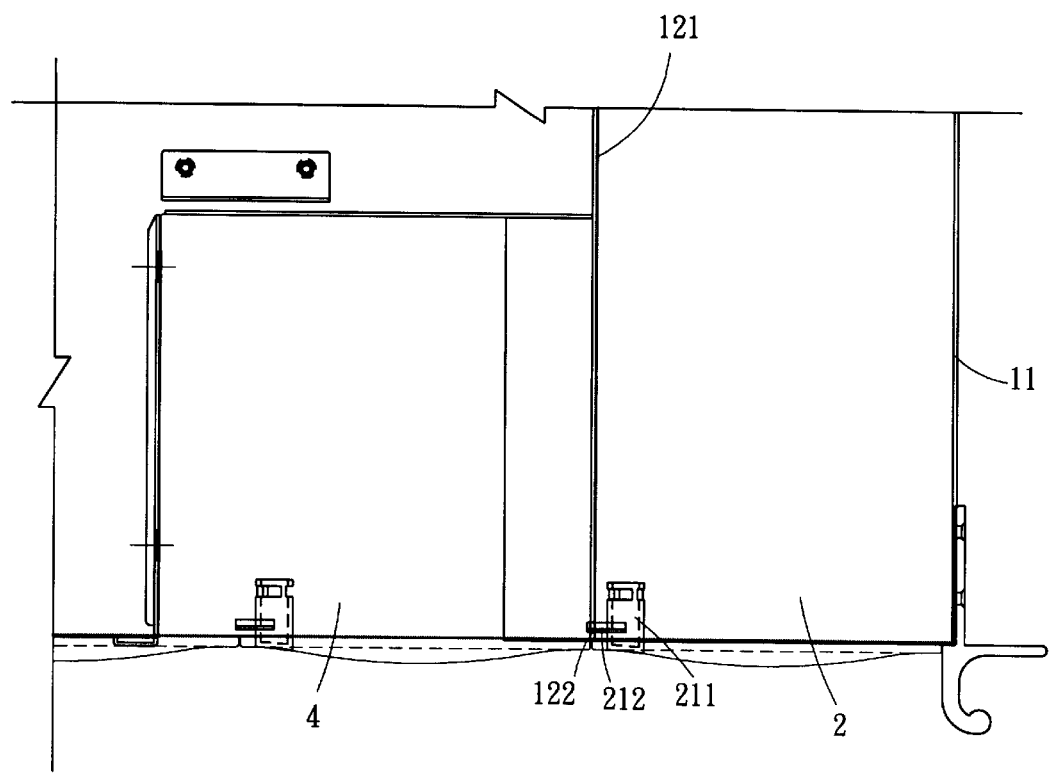
FIG. 2 is a partial upper view of the present invention.
Figure 3:
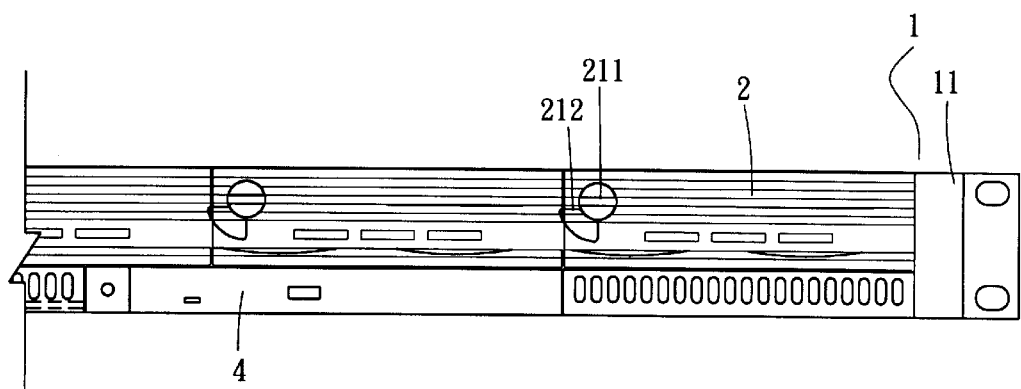
FIG. 3 is a front view of the present invention.
Figure 4:
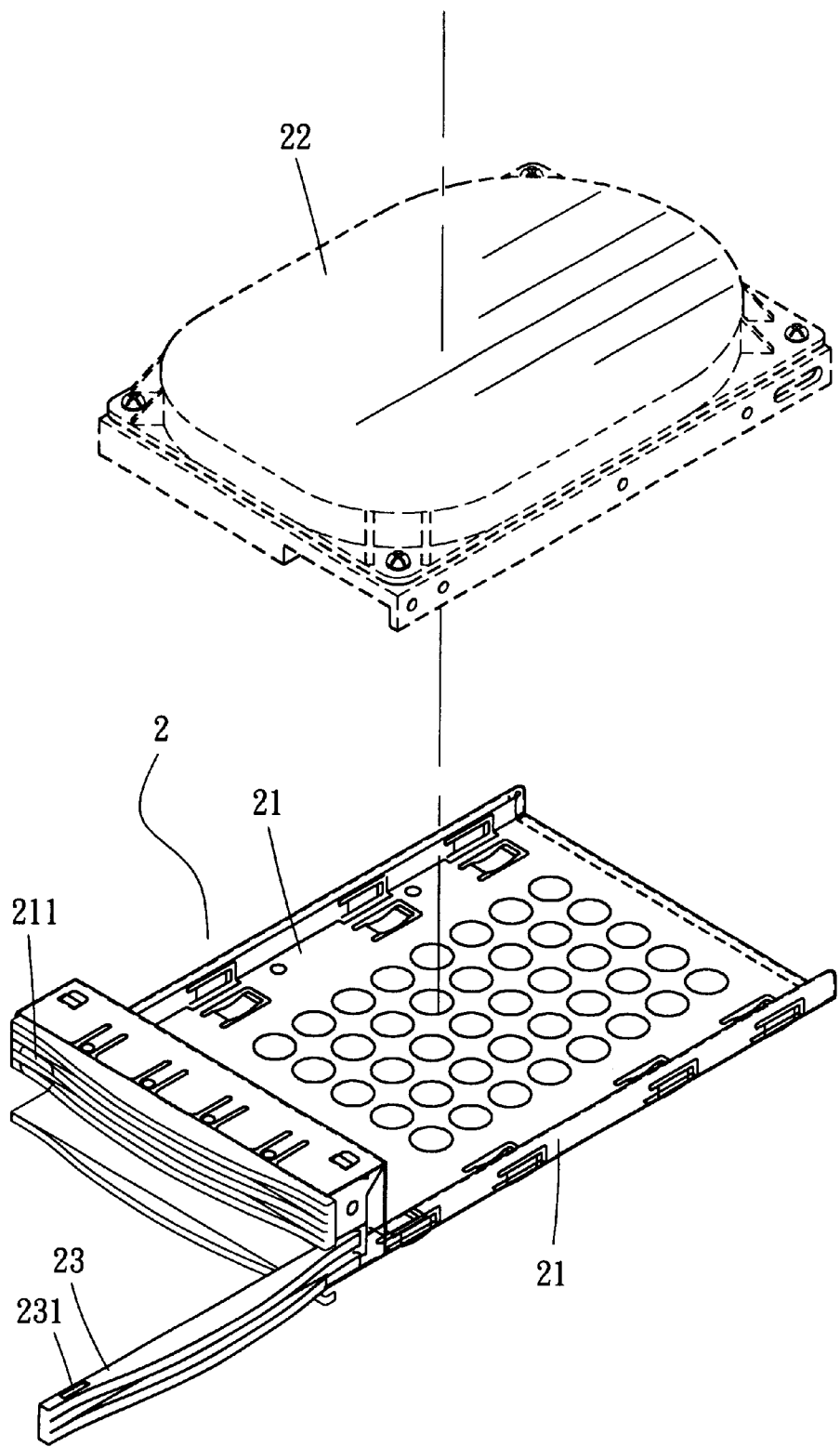
FIG. 4 is an exploded perspective view about the embodiment of the disk drive and compact disk drive.

With reference to FIGS. 2, 3 and 4, the disk drive set 2 has a special designed disk driving supporter 21 for fixing a hard disk drive 22. A front edge of the disk driving supporter 21 is installed with a rotary handle 23 and a screwing button lock 211. The screwing button lock 211 has a buckle 212 which can be buckled to the buckling hole 231 of the rotary handle 23 and the buckling groove 122 of the spacer 121 of the disk groove 12 when the disk drive 2 is placed into the disk groove 12 and the rotary handle 23 is buckled. Meanwhile, the disk drive set 2 is fixed to the frame 11 and the rotary handle 23 is buckled to the disk drive set 2.

Figure 5:
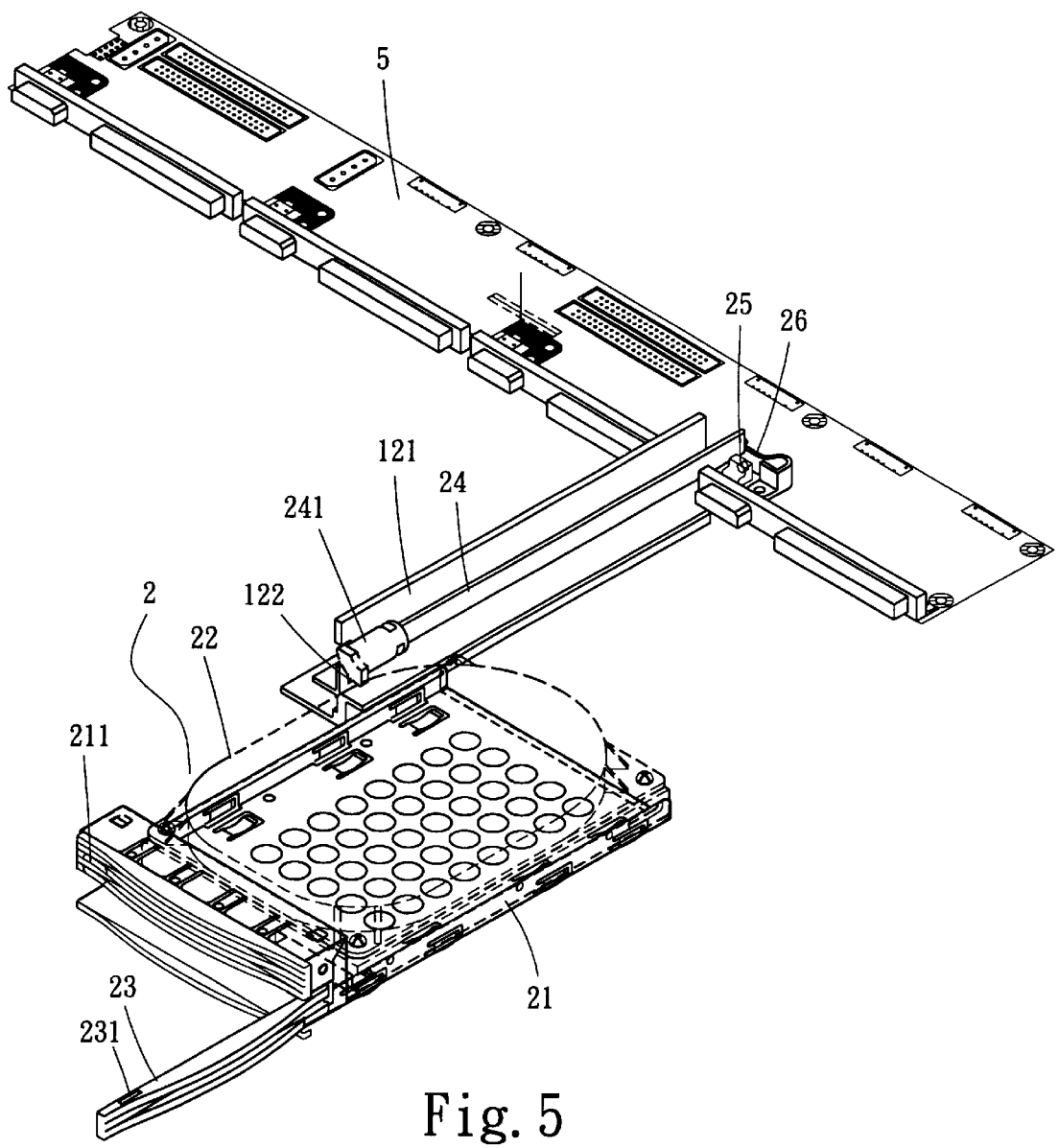
FIG. 5 is a perspective view about the embodiment of an application of a disk drive.
Figure 6:
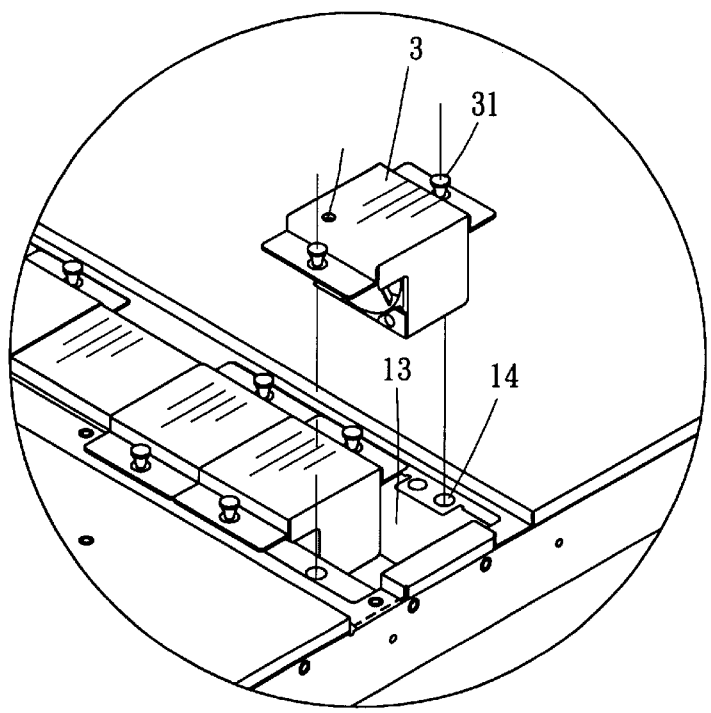
FIG. 6 is a partial perspective view of an embodiment of a heat dissipating fan in the present invention.
Figure 7:
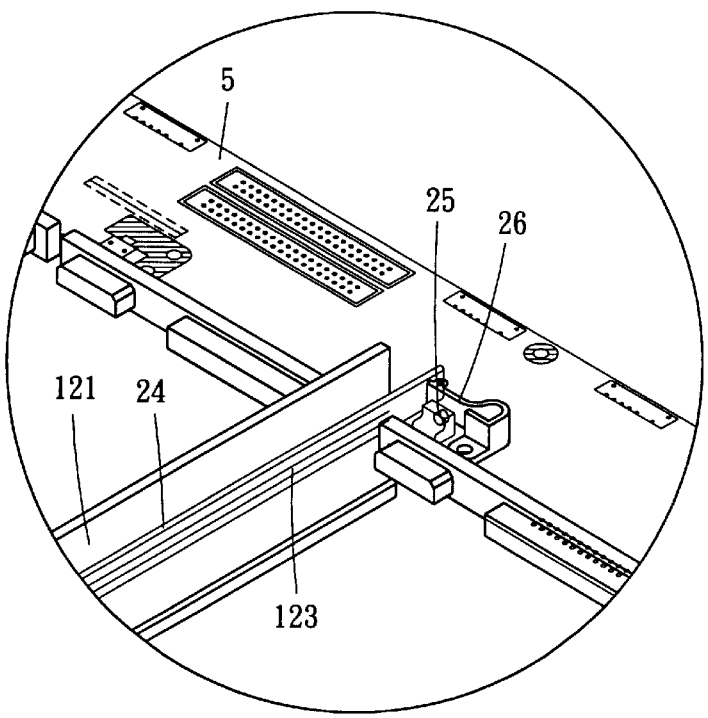
FIG. 7 is a partial perspective view of an application of the disk drive of the present invention.

Referring to FIGS. 5 to 7, a sliding groove 123 is preset on the spacer 121 at one side of the disk groove 12. The sliding groove 123 has an elastic sliding linkage 24. The front end of the elastic sliding linkage 24 is a pushing block 241. The frame 11 is installed with an interface circuit board 5. At position with respect to the distal end of the disk drive 2 is installed with touch controlled switches 25. Each touch controlled switch 25 is controlled by an elastomer 26.

When the disk drive set 2 is installed in the disk groove 12 and the rotary handle 23 is rotated (meanwhile the screwing button lock 211 is rotated so that the buckle 212 is buckled to the buckling hole 231 of the rotary handle 23 and the buckling groove 122. At the same time, the disk drive set 2 is fixed to the frame 11 and the rotary handle 23 is buckled to the disk drive set 2), then the rotary handle 23 pushes the pushing block 241 so that the elastic sliding linkage 24 pushes the elastomer 26 away. Thereby, the touch controlled switch 25 actuates to generate a switching signal. Namely, the main control center of the mainframe is informed that the disk drive set 2 has been connected. On the contrary, when the disk drive set 2 is updated, the screwing button lock 211 is rotated firstly so that the buckle 212 separates from the buckling hole 231 of the rotary handle 23 and the buckling groove 122. Thereby, the disk drive set 2 releases from the frame 11 and the rotary handle 23 is at a condition capable of being screwed out. Then the rotary handle 23 is screwed out so that the elastic sliding linkage 24 moves backward to cause the elastomer 26 to press the touch controlled switch 25. Thereby, the circuit will separate therefrom, and thus the disk drive set 2 can be retracted safely.

With reference to FIGS. 1 to 6, in the industrial computer independent unit device of the present invention, the front positioning groove 13 has an opened structure. Namely, each heat dissipating fan 3 can be directly replaced by another fan 3. Two ends of each fan groove 13 have respective thread holes 14 so that the threaded rods 31 of the heat dissipating fan 3 can screw into the holes.

Figure 8:
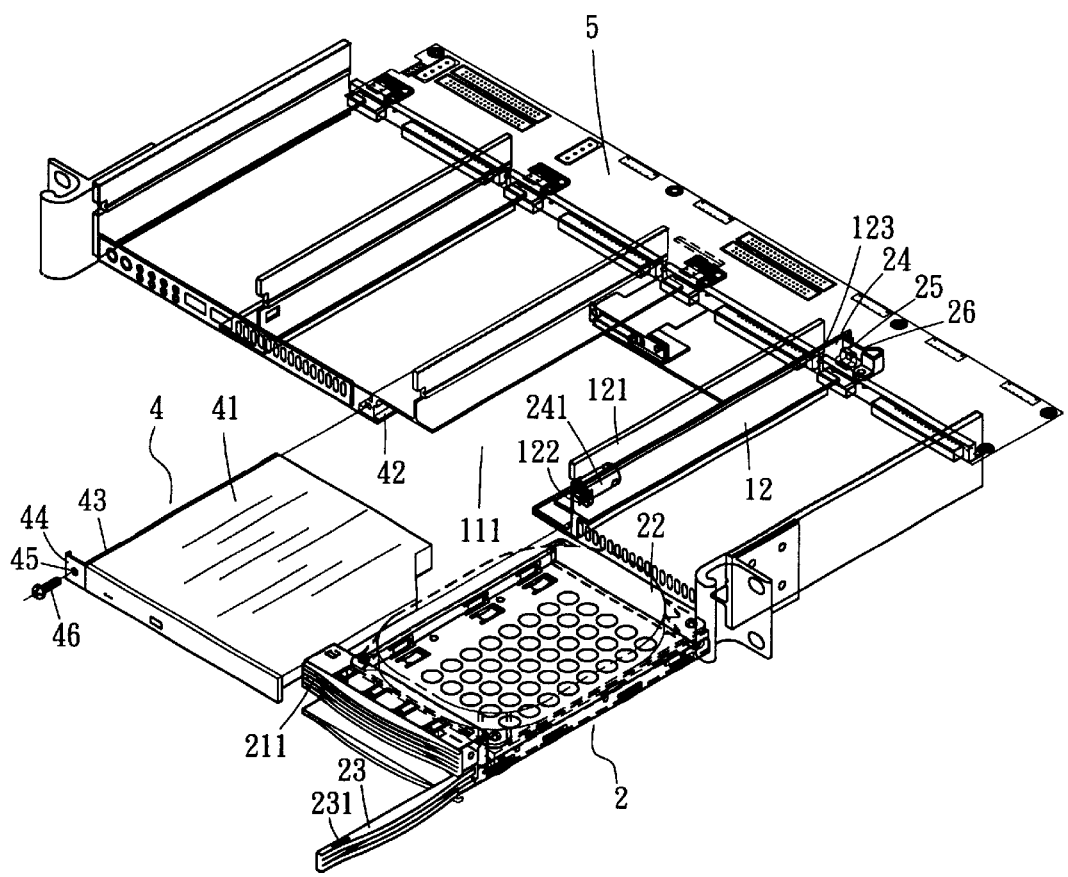
FIG. 8 is a partial perspective view of the compact disk drive of the present invention.

With reference to FIGS. 1 and 8, in the industrial computer independent unit 1 of the present invention, the front edge of the frame 11 has a disk groove 12 which can be placed with four disk drive sets 2, and a compact disk drive groove 42 for being installed with a compact disk drive set 4 is installed below the disk drive set 2. Since the industrial computer independent unit 1 has been standardized, the thickness thereof is fixed so that the disk drive set 2 and the compact disk drive set 4 can not be installed therein at the same time period. Therefore, in the present invention, the frame 11 is formed with an open space 111 at position with respect to the lower side of the compact disk drive groove 42. Thereby, the compact disk drive set 4 slides into the frame along the compact disk drive groove 42. Thereby, it can be received in the independent unit 1 not to protrude out from the independent unit 1. Thus, the compact disk drive set 4 can be inserted into the independent unit 1 according to the present invention for updating a new one, or setting program files or data.

In aforesaid compact disk drive set 4, a supporting seat 43 is utilized to fix a compact disk drive 41. One side of the supporting seat 43 is installed with a handle 44. The handle 44 is formed with a hole 45. Thereby, a screw 46 serves to fixed the compact disk drive set 4 to the frame 11. In realize the present invention, in general, a set of industrial computers are connected with a plurality of independent units 1. Only one of the plurality of independent unit 1 is installed with the compact disk drive set 4. The compact disk drive groove 42 of other independent units 1 are only installed with supporting seats 43 without being disposed with compact disk drive. When one of the independent unit 1 needs a compact disk drive set, the compact disk drive set 4 is moved to and inserted into the independent unit 1.

In the present invention, each disk drive set 2 and each heat dissipating fan 3 are connected to indicating lights 6 at one side of the frame 11. Thereby, if any of the disk drive set 2 and heat dissipating fan 3 has any fault, it will emit an alarm voice and the indicating lights 6 will light up to inform the user and indicate what unit has a fault.

Thereby, in the industrial computer independent unit device of the present invention, a compact disk drive set 4, more (four) hard disk drive sets 2 and heat dissipating fans 3 can be installed therein at the same time period. The hard disk drive sets and the heat dissipating fans 3 can be updated or maintained without needing to stop the operation of the computer mainframe or to open the casing. Furthermore, if any of the disk drive sets 2 or hard disk drive sets 3 has fault, an alarm voice will be emitted and indicating lights 6 will light up.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the cope of the invention as defined in the appended claims.

What is claimed is:

1. An industrial computer independent unit device capable of receiving a compact disk drive set, more than four hard disk drive sets, and a plurality of heat dissipating fans; the hard disk drive sets and the heat dissipating fans being updated or maintained without needing to stop the operation of a computer mainframe or to open a casing, comprising:

an industrial computer independent unit having a frame; a front edge of the frame having a disk groove for being placed with four disk drive sets and a compact disk drive groove for placing a compact disk drive set; a fan groove being installed near a central portion of the industrial computer independent unit for being installed with a plurality of heat dissipating fans; and an interface circuit board installed in the frame at position with respect to each disk drive and the interface circuit board being installed with a touch controlled switch; and each touch controlled switch being controlled by an elastomer.

2. The industrial computer independent unit device as claimed in claim 1, wherein the disk drive set has a special designed disk driving supporter for fixing a hard disk drive; a front edge of the disk driving supporter is installed with a rotary handle and a screwing button lock; the screwing button lock has a buckle which can be buckled to a buckling hole of the rotary handle and a buckling groove of a spacer of the disk groove when the disk drive is placed in the disk groove and the rotary handle is buckled; and the disk drive set is fixed to the frame and the rotary handle is buckled to the disk drive set.

3. The industrial computer independent unit device as claimed in claim 1, wherein a sliding groove is installed at one side of the disk groove; the sliding groove has an elastic sliding linkage; a front end of the elastic sliding linkage is a pushing block; the frame is installed with an interface circuit board; at a position with respect to a distal end of the disk drive is installed with touch controlled switches; as the elastic sliding linkage is pushed to descend to a lowest position, the touch controlled switch on the interface circuit board will be touched and operate.

4. The industrial computer independent unit device as claimed in claim 1, wherein the front positioning groove has an opened structure, each heat dissipating fan is directly replaced by another fan; two ends of each fan groove have respective threaded holes for being inserted by the threaded rods of the heat dissipating fan.

5. The industrial computer independent unit device as claimed in claim 1, wherein the frame is formed with an space having an opening at position with respect to the lower side of the compact disk drive groove; thereby, the compact disk drive set slides into the frame along the compact disk drive groove so that it can be received in the independent unit not to protrude out from the independent unit; thus, the compact disk drive set is inserted into the independent unit according to the present invention for updating a new one, or setting program files or data.

6. The industrial computer independent unit device as claimed in claim 1, wherein each disk drive set and each heat dissipating fan are connected to indicating lights at one side of the frame; thereby, if any of the disk drive set and heat dissipating fan has any fault, it will emit an alarm voice and the indicating lights will light up to inform the user and indicate a fault unit.

7. The industrial computer independent unit device as claimed in claim 1, wherein in the compact disk drive set, the compact disk drive is fixed to a supporting seat; one side of the supporting seat has a handle, and the handle has a hole for being passed through by a screw to fix the compact disk drive.

* * * * *